United States Patent [19]

Sadarnac et al.

[11] Patent Number: 5,627,743
[45] Date of Patent: May 6, 1997

[54] CHOPPER POWER SUPPLY ADAPTED TO ENABLE LOW-VOLTAGE SWITCHING TO BE PERFORMED

[75] Inventors: Daniel Sadarnac; Sylvain d'Almeida, both of Gif sur Yvette, France

[73] Assignee: Alcatel Converters, Paris, France

[21] Appl. No.: 397,773

[22] Filed: Mar. 2, 1995

[30] Foreign Application Priority Data

Mar. 3, 1994 [FR] France .................................. 94 02462

[51] Int. Cl.$^6$ ................................................ H02M 7/00
[52] U.S. Cl. ...................................... 363/124; 363/132
[58] Field of Search ........................ 363/98, 124, 132

[56] References Cited

U.S. PATENT DOCUMENTS

| | | | |
|---|---|---|---|
| 4,230,955 | 10/1980 | Johannessen | 363/124 |
| 5,485,365 | 1/1996 | Dan-Harry | 363/132 |
| 5,532,919 | 7/1996 | Gegner | 363/124 |

OTHER PUBLICATIONS

*21st Annual IEEE Power Electronics Specialists Conference PESC '90 Record*, 11 Jun. 1990, San Antonio, Texas, pp. 298–304, XP173920, Ferreira, "A generic soft switching converter topology with a parallel nonlinear network for high power application".

*18th Annual Power Electronics Specialists Conference PESC '87 Record*, 11 Jun. 1987, Blacksburg, VA pp. 424–430 –Patterson, "Pseudo-resonant full bridge DC/DC converter".

Primary Examiner—Stuart N. Hecker
Attorney, Agent, or Firm—Sughrue, Mion, Zinn, Macpeak & Seas

[57] ABSTRACT

A chopper power supply of the invention includes a bridge arm constituted by two switching sections in series and receiving a DC voltage. Each switching section includes switching means in parallel with a capacitor, the switching means being controlled so as to supply an AC voltage to a load. A pulse current source is connected to the load, the pulse current source being constituted by an LC-type circuit dimensioned so that the current flowing through the circuit is delayed by $\pi/2$ relative to the voltage applied to the load so as to deliver current pulses for alternately charging and discharging each of the capacitors on the edges of the AC voltage.

6 Claims, 8 Drawing Sheets

CHOPPER POWER SUPPLY ADAPTED TO ENABLE LOW-VOLTAGE SWITCHING TO BE PERFORMED

The invention relates to chopper power supplies, and it relates more particularly to a chopper power supply including a bridge arm having switching sections driven so as to perform low-voltage switching.

BACKGROUND OF THE INVENTION

FIG. 1 shows a conventional chopper power supply of the half-bridge type. A chopper power supply of that type is described, in particular, in "Les alimentations à fréquence de découpage élevée" ["Power supplies having high chopper frequencies"] by Daniel Sadarnac, ESE 9, Eyrolles.

A voltage source supplies a DC voltage E to a bridge arm including two switching sections 10 & 11 in series. Switching section 10 comprises the following connected together in parallel: switching means T1, a protective diode D1, and a capacitor C1. Likewise, switching section 11 comprises the following, also connected together in parallel: switching means T2, a protective diode D2, and a capacitor C2. The midpoint P of the bridge arm shown is connected to an inductor L1 followed by a load, constituted in this example by a transformer having a primary inductor L2 and a secondary inductor L3. A capacitor C3 is connected in parallel to the primary inductor L2. The other end of the load constituted by inductor L2 is connected between two maintaining capacitors C4 and C5, to which the DC voltage E is applied.

At the secondary winding of the transformer, two rectifying diodes D3 and D4 co-operate with two inductors Ls and a smoothing capacitor Cs to supply a DC output voltage Vs. Voltage Vs is applied to a load (not shown).

Operation of that power supply is described with reference to FIG. 2 which shows four corresponding timing diagrams (A to D) of the signals shown in FIG. 1.

For example, the switching means T1 and T2 are constituted by MOSFET power transistors including the protective diodes D1 and D2. A control circuit (not shown) applies control pulses shown in timing diagrams A and B to the gates of the transistors T1 and T2. The pulses have a period T and are offset in time so as to switch the transistors T1 and T2 on (so that they are saturated) and off (so that do not conduct) in alternation. When a pulse is applied to the gate of one of the transistors, it is switched on. Such a pulse is applied at time t1 to transistor T1, with transistor T2 not conducting. The voltage e (timing diagram C) measured between the midpoint between capacitors C4 and C5 and the midpoint of the bridge arm is equal to +E/2, which is the voltage present across the terminals of capacitor C4. The current i (timing diagram D) flowing through transistor T1 increases and is supplied to the load constituted by inductor L1 and by the inductor L2 of the primary winding of the transformer. At time t2, transistor T1 is switched off and inductor L1 prevents the current from passing through rapidly, thereby charging capacitor C1 and discharging capacitor C2. The voltage e then decreases to −E/2 at time t3, when diode D2 starts conducting. Capacitor C2 then presents a low voltage across its terminals. A guard time dt is provided between the end of conduction of one transistor and the start of conduction of the other transistor so as to prevent the capacitors C1 and C2 from being suddenly charged and discharged. In this way, losses are decreased. Once the voltage e has become negative, the current i is reversed and, at time t4, transistor T2 is switched on. The phenomenon is then repeated symmetrically.

In this way, a symmetrical AC voltage e is generated which makes it possible to obtain an output voltage Vs that is a function of the chopper period T.

The capacitance of the capacitors C1 and C2 results from a compromise between the losses caused, and the chopper frequency. If their capacitance is large, switching losses decrease but the chopper frequency must be relatively low because it takes more time to charge them and to discharge them. Furthermore, their presence is essential in order to perform low-voltage switching, also referred to as "soft switching".

The main drawback of a chopper power supply of that type is that it is essential for inductor L1 to be used in order to enable the capacitors C to be charged and discharged. When the load is constituted by a transformer, its primary inductance is too low to make it possible to generate a high enough charging current and a high enough discharging current for the capacitors C1 and C2. At the capacitor charge and discharge instants, the current i must be high to enable fast charging and fast discharging. In this way, with reference to FIG. 2, the current must be high enough during the periods t2 to t3 and t5 to t6, but it is also high the rest of the time while it is flowing through the transistors T1 or T2 or through the diodes D1 or D2, and this gives rise to conduction losses and to switching losses. The transistors must therefore be over-dimensioned.

Moreover, if the impedance presented by the load powered by that apparatus decreases, the current i must nevertheless be present and must be high enough at the switching instants. In the absence of load, losses are therefore high.

Another problem posed by inductor L1 is that it is difficult to construct, and it gives rise to high iron losses. It is necessary to implement that inductor in the form of a torus for reasons of electromagnetic radiation, and, to prevent it from overheating, it must be over-dimensioned, which makes the apparatus less compact. In high-current applications, e.g., for a 500 W chopper power supply, the inductance of L1 must be approximately equal to a few μH and it must be capable of passing 15 A. It can be considered that the presence of that inductance gives rise to a loss of efficiency of about 3%. Since iron losses increase with $f^{3/2}$, that apparatus is also limited to chopper frequencies of less than 1 MHz.

Furthermore, when powering a load that varies, or if the voltage E is not fixed, the output voltage Vs can be kept constant only by servo-controlling the chopper frequency. This increases the overall size of the apparatus, and the cost thereof, and poses problems related to electromagnetic radiation.

OBJECTS AND BRIEF SUMMARY OF THE INVENTION

A particular object of the invention is to remedy those multiple drawbacks.

More precisely, an object of the invention is to provide a chopper power supply that does not require the presence of an inductance such as L1, and that can also operate at chopper frequencies that are much higher than in the state of the art, while reducing losses and overall size.

This object and others that appear below are achieved by providing a chopper power supply including at least one bridge arm constituted by two switching sections in series receiving a DC voltage to be chopped, each switching section including switching means in parallel with a capacitor and a protective diode, the switching means being alternately closed and opened so as to supply an AC voltage at a chopper frequency, which voltage is applied to a load having one of its terminals connected to a common point that is common to the switching sections, a pulse current source being connected to the common point, the pulse current source being constituted by an LC-type circuit dimensioned so that the current flowing through the circuit is delayed by π/2 relative to the voltage applied to the load so as to deliver current pulses for alternately charging and discharging each of the capacitors on the edges of the AC voltage.

In a preferred embodiment, the pulse current source is in parallel with at least one of the switching sections. In another embodiment, one of the terminals of the pulse current source is connected to the midpoint, and its other terminal is connected between two capacitors in series to which the DC voltage is applied.

Advantageously, the pulse current source is constituted by a set of LC sections in parallel, each LC section being constituted by an inductor in series with a capacitor dimensioned so that the current flowing through each LC section has an extremum that is in phase with the rising and falling edges of the voltage applied to the section. This is obtained by π/2 phase-shifting of each of the current spectrum components of each of the sections relative to each of the same-rank spectrum components of the applied voltage.

The pulse current source is constituted by three LC sections in parallel, and the switching means are constituted by MOSFET transistors including the protective diodes.

BRIEF DESCRIPTION OF THE DRAWINGS

Other characteristics and advantages of the invention will appear on reading the following description of preferred embodiments given by way of non-limiting example and with reference to the accompanying drawings, in which.

MORE DETAILED DESCRIPTION

Figure 1:
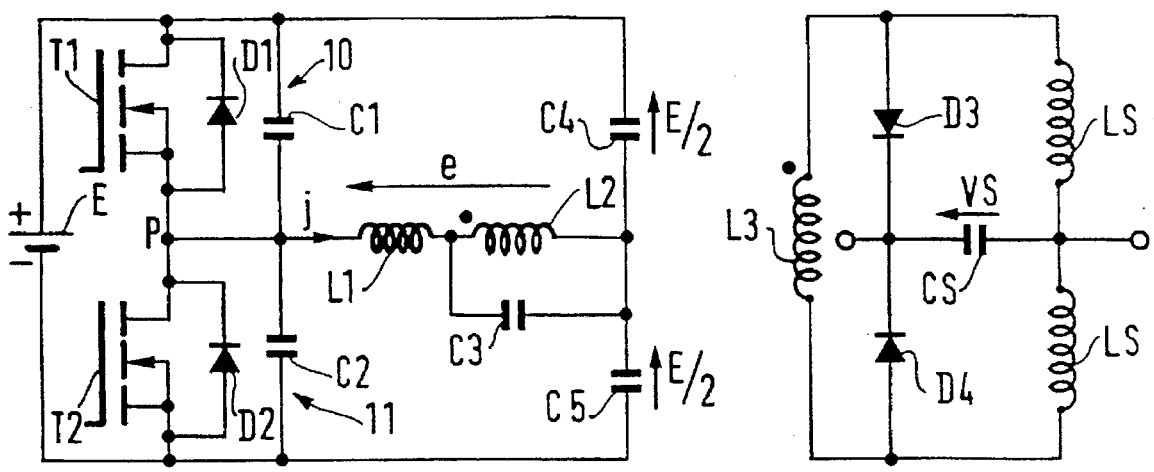
FIG. 1 shows a known type of chopper power supply.
Figure 2:
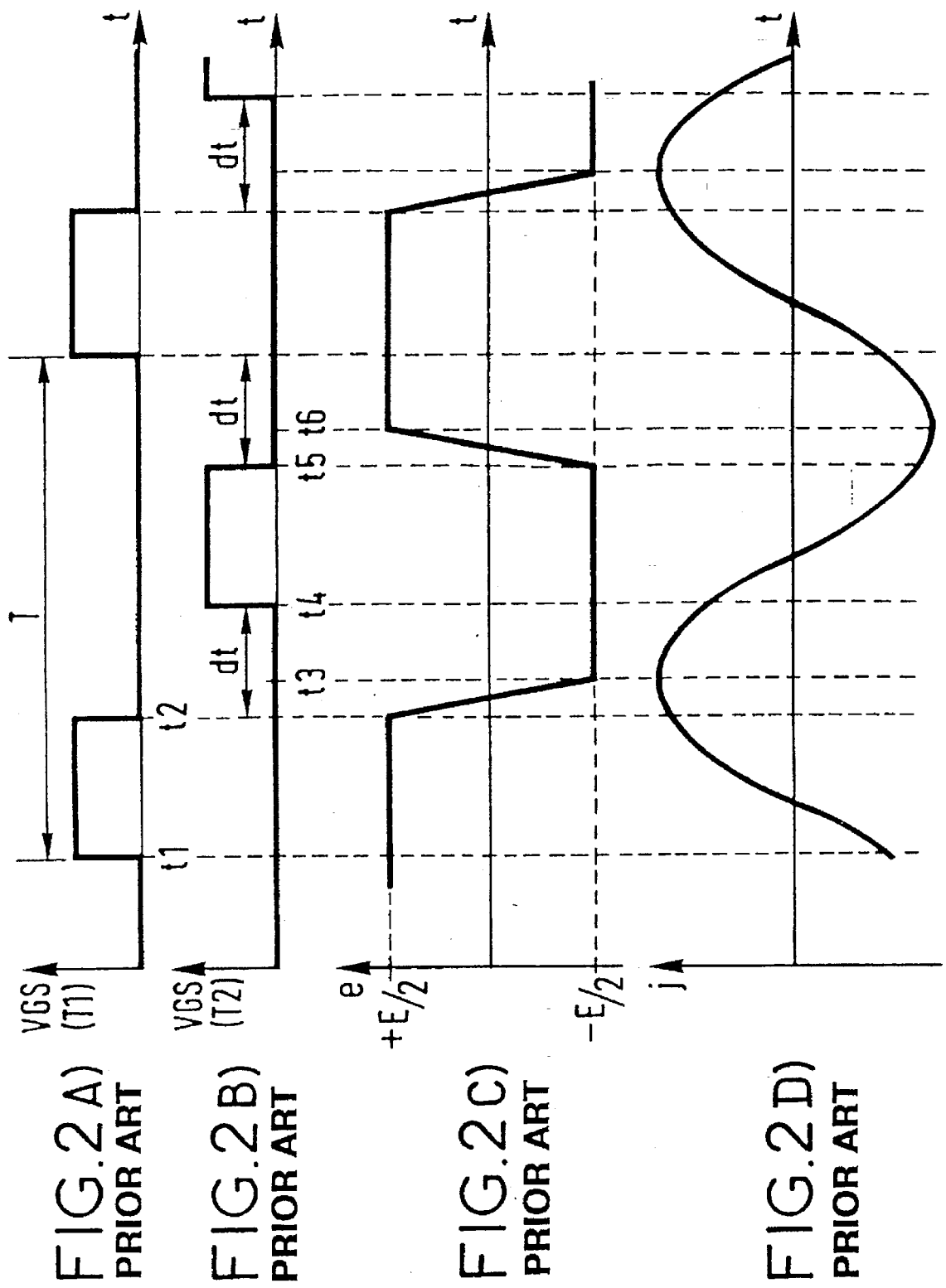
FIG. 2 shows corresponding timing diagrams relating to FIG. 1.

FIGS. 1 and 2 are described above with reference to the state of the art.

Figure 3:
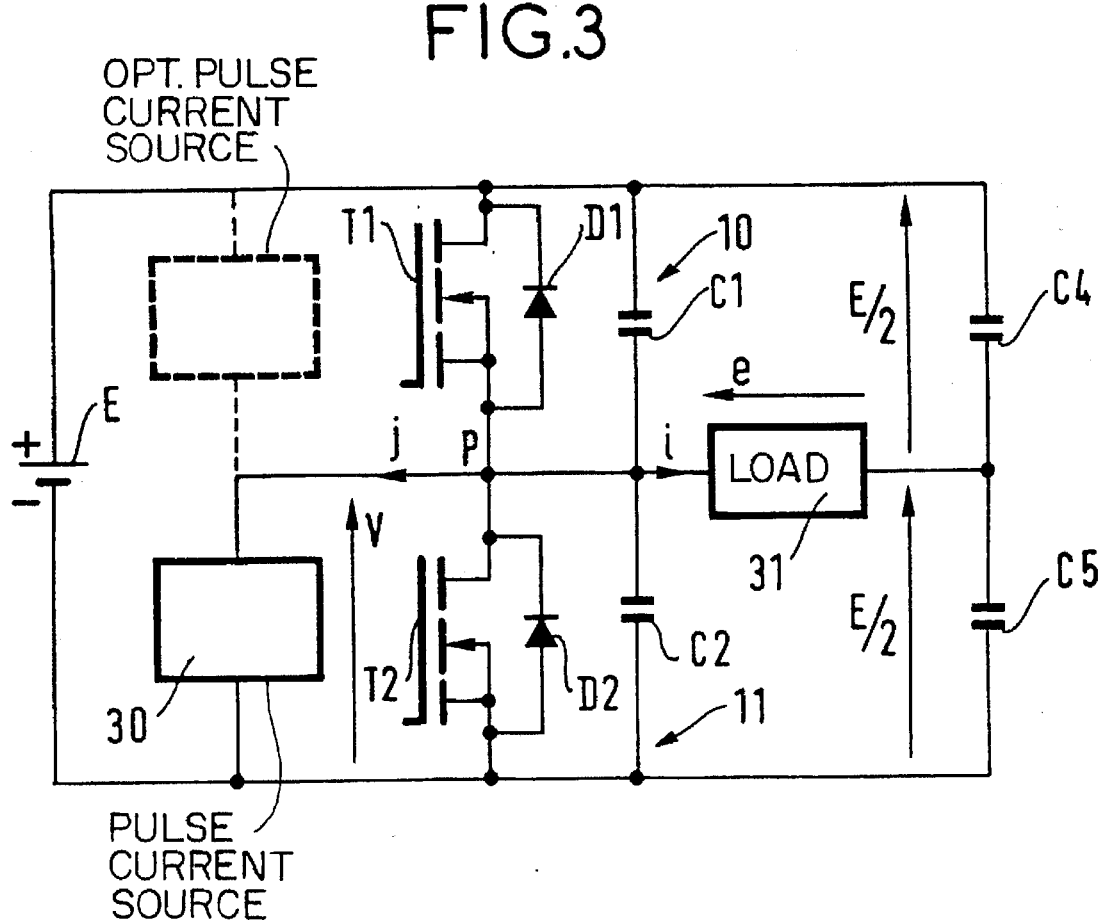
FIG. 3 shows a first embodiment of the chopper power supply of the invention.

FIG. 3 shows a first preferred embodiment of the invention where the chopper power supply operates as an inverter. Elements identical to those shown in FIG. 1 are given the same references.

The invention lies in the structure of the bridge arm comprising the two switching sections 10 and 11. The midpoint P of the bridge arm is connected to a pulse current source 30 constituted by an LC-type circuit, i.e. constituted by chokes and by capacitors, which circuit is dimensioned so that the current flowing through it is delayed by π/2 relative to the voltage applied to the load, referenced 31. For example, the load is constituted by induction-heating apparatus. The pulse current source 30 is designed to deliver current pulses for alternately charging and discharging each of the capacitors C1 and C2 on the edges of the AC voltage e.

Figure 12:
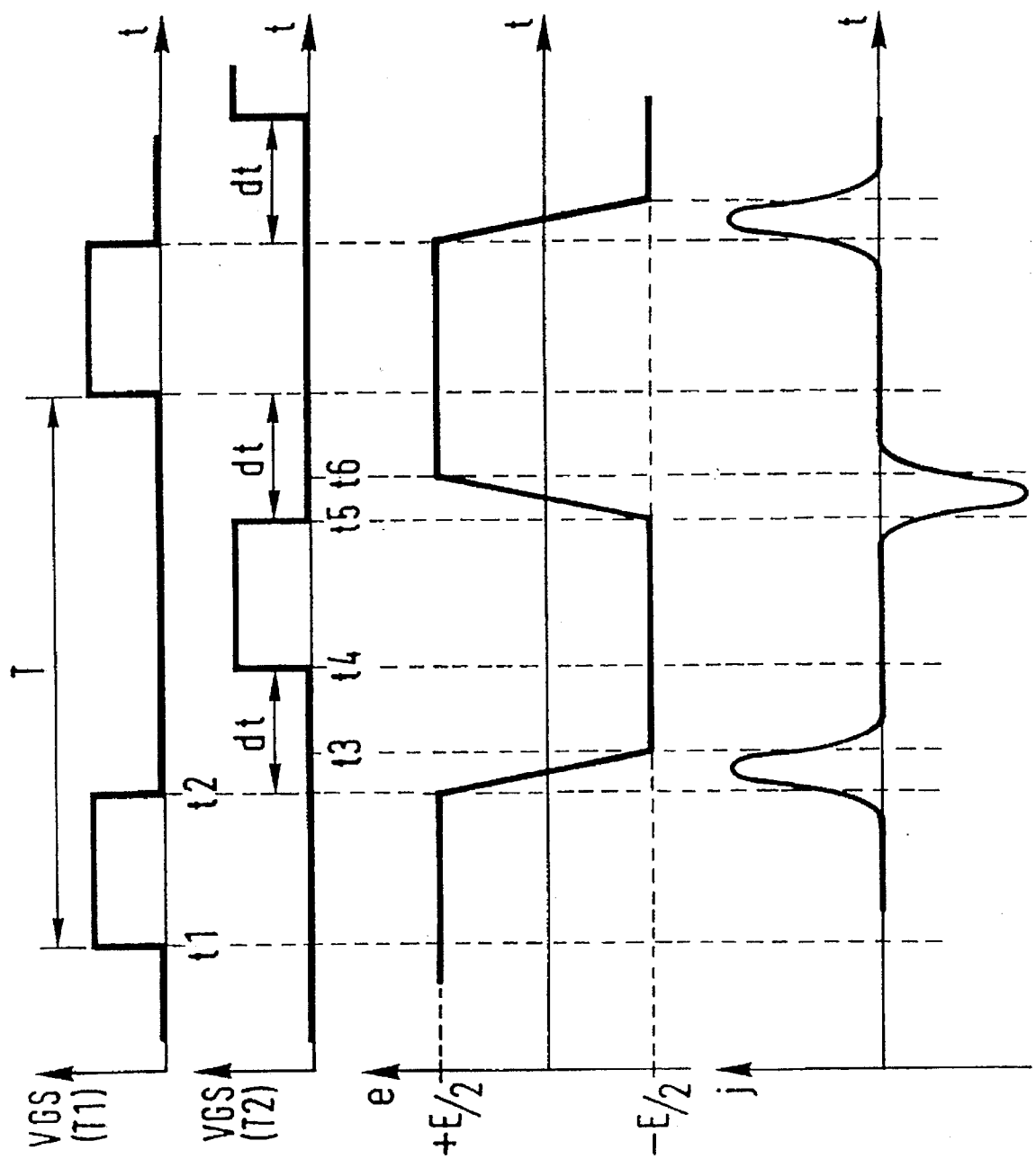
FIG. 12 shows corresponding timing diagrams relating to FIGS. 3 and 4.

The timing diagram D in FIG. 12 shows the appearance of the current i supplied by the current source 30, the other timing diagrams (A to C) being identical to those in FIG. 2. The function of the source 30 is therefore to generate a current pulse at instants when the switching means are opened. The current pulses are centered on the rising and falling edges of e. The current pulses are positive when the voltage e decreases and they are negative when e increases.

Figure 5:
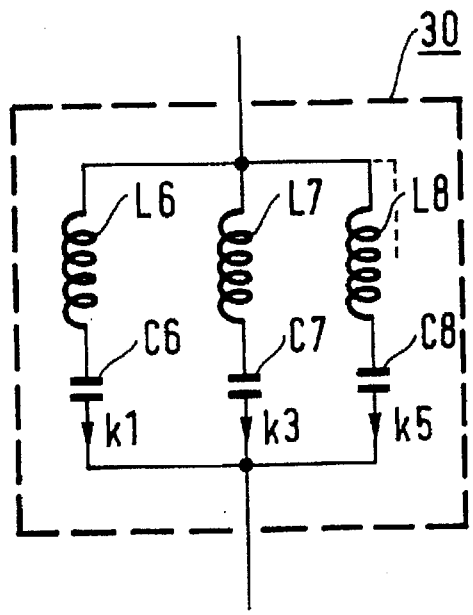
FIGS. 5 to 8 show a plurality of embodiments of the pulse current source shown in FIG. 3 and/or FIG. 4.
Figure 7:
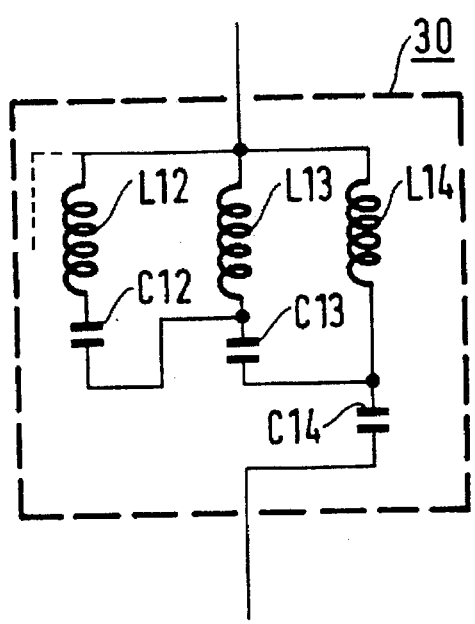

FIGS. 5 and 7 show embodiments of the pulse current source 30 organized to be used in the circuit shown in FIG. 3.

Figure 9:
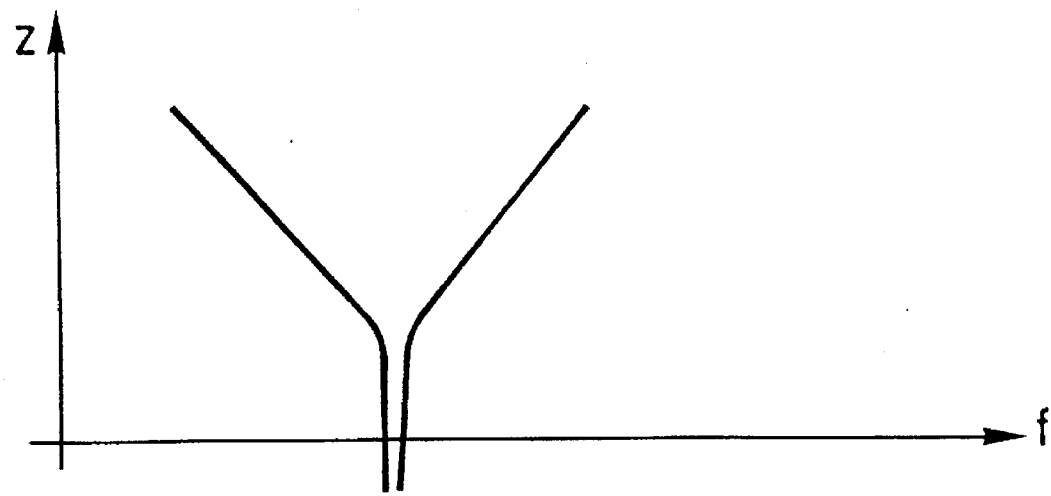
FIGS. 9 and 10 respectively show the impedance presented by an LC section of FIG. 5 and the phase-shift of the current flowing through it relative to the voltage across its terminals, as a function of frequency.
Figure 10:
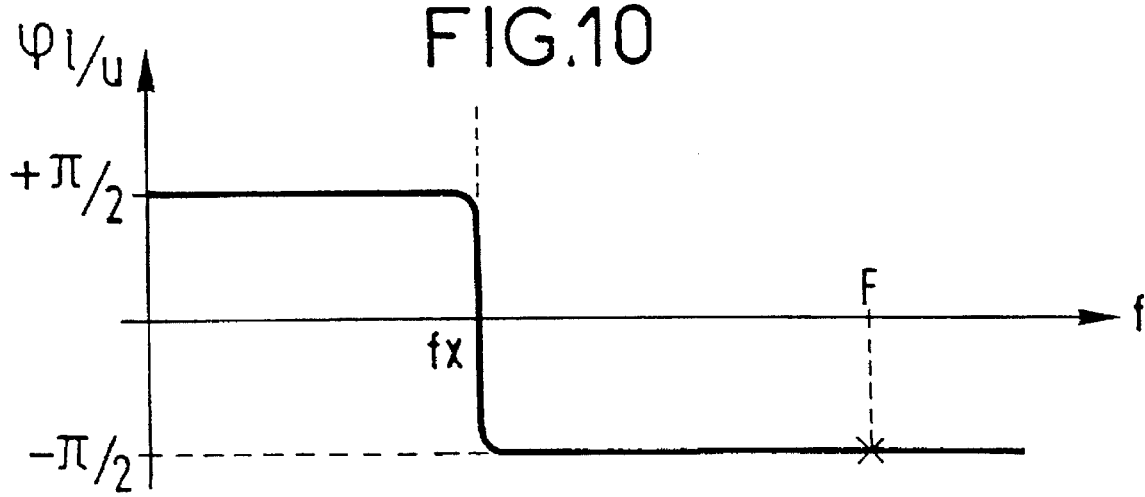

In FIG. 5, the pulse current source 30 is constituted by a set of LC sections in parallel. More precisely, each LC section is constituted by an inductor L6, L7, or L8 in series with a respective capacitor C6, C7, or C8. Each LC section is dimensioned so as to delay the current passing through it by π/2 relative to the voltage across its terminals, as shown in FIGS. 9 and 10. The current flowing through each LC section has an extremum in phase with the rising and falling edges of the voltage applied to the section. This is obtained by π/2 phase-shifting of each of the current spectrum components of each of the sections relative to each of the same-rank spectrum components of the applied voltage.

FIG. 9 shows the impedance presented by an LC section as a function of frequency. An LC section constitutes a filter that rejects the band of center frequency fx. FIG. 10, which gives the phase-shift ø of the current flowing through the LC section relative to the voltage across its terminals, shows a phase-shift of +π/2 for frequencies lower than fx, and a phase-shift of −π/2 for frequencies higher than fx. In this way, by dimensioning each LC section so that the phase-shift of the current relative to the voltage is −π/2, e.g. by under-dimensioning the section so as to tune it to a frequency F that is higher than fx, currents are obtained that correspond to the fundamental and to the odd harmonics of the voltage e, the sum of which currents corresponds to the current shown in timing diagram D in FIG. 12.

Figure 11:
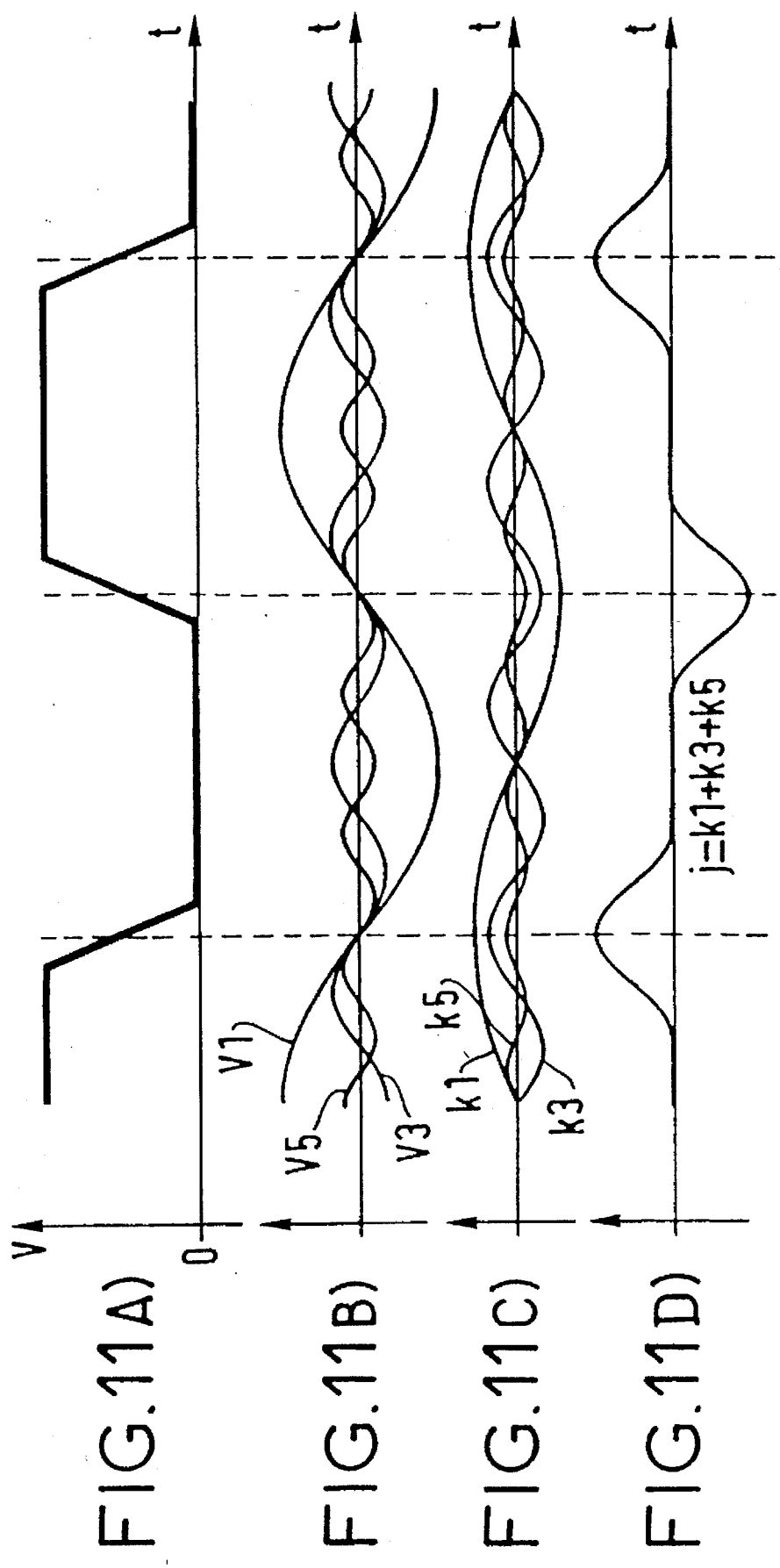
FIG. 11 shows corresponding timing diagrams making it possible to understand how the pulse current source operates.

FIG. 11 shows four corresponding timing diagrams making it possible to explain how the current source operates. V designates the voltage across the terminals of the current source 30. This voltage varies over the range 0 to +E. Timing diagram B shows the variations in the voltages V1, V3, and V5 corresponding respectively to the harmonics of rank 1, 3, and 5 of voltage V, i.e. to frequencies f1, f3, and f5. The sum of all of the odd harmonics is equal to V. Timing diagram C shows the variations in the currents k1 to k3 flowing through the LC sections shown in FIG. 5. These currents are phase-shifted by 90° relative to the corresponding voltages V1 to V5. The sum of the currents, which sum is obtained by putting the LC sections in parallel, makes it possible to obtain the current i of timing diagram D. Naturally, a larger number of LC sections could be used, thereby obtaining current pulses of greater amplitude and of narrower width. However, tests have shown that three LC sections in parallel offer a good compromise between the overall size of the apparatus and the shape of the pulses. The ideal shape for a pulse is rectangular.

The pulse current source shown in FIG. 7 constitutes a possible alternative, with a section L12C12 in parallel with a choke L13 in series with a capacitor C13, the choke L13 and the capacitor C13 being in parallel with a choke L14, itself in series with a capacitor C14.

The current source in FIG. 7 supplies current pulses that are similar in appearance to those supplied by the source in FIG. 5.

It should be noted that the pulse current source 30 shown in FIG. 3 may also be connected to the + terminal of the voltage E, as shown in dashed lines in FIG. 3. It is also possible to place a pulse current source at the terminals of each switching section.

The LC sections shown in FIG. 5 may also be shared between the positive potential and the negative potential of the voltage E. By way of example, sections L6C6 and L7C7 may be connected to the − terminal, while section L8C8 is connected to the + terminal.

Figure 4:
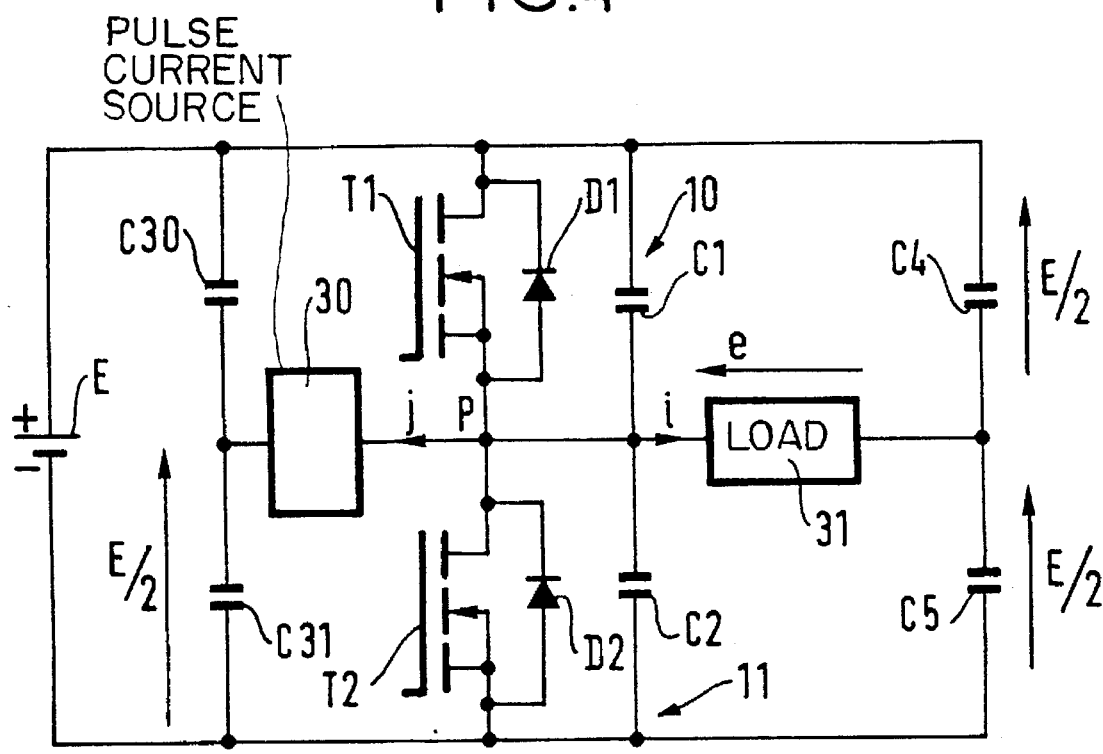
FIG. 4 shows a second embodiment of the chopper power supply of the invention.

FIG. 4 shows another embodiment of a chopper power supply of the invention, which also operates like an inverter. This embodiment differs from the FIG. 3 embodiment in that the terminal of the source 30 (which may, in particular, also be implemented as shown in FIGS. 5 and 7), which terminal is connected to the − terminal in FIG. 3, is connected in FIG. 4 between two capacitors C30, C31 in series, to which the DC voltage E is applied. This circuit offers the advantage that the capacitors used for implementing the pulse current source are no longer subjected to a mean voltage equal to E/2, and they merely have to withstand the amplitude of an AC voltage component which is applied to them. Capacitors that are cheaper and more compact can then be used.

Figure 6:
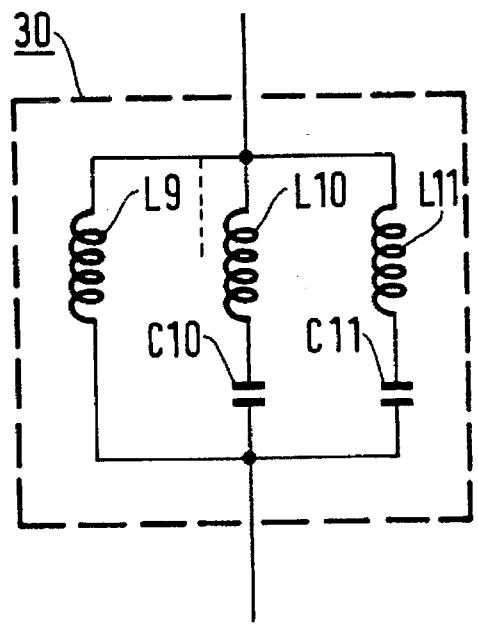
Figure 8:
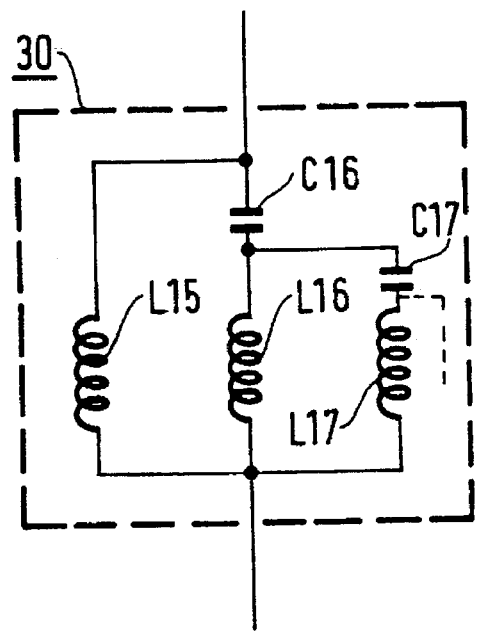

FIGS. 6 and 8 show embodiments of the pulse current source that are also suitable for the circuit shown in FIG. 4. These sources are also implemented using chokes and capacitors. In FIG. 6, a choke L9 is in parallel with two series sections L10C10 and L11C11. This embodiment differs from the embodiment shown in FIG. 5 in that capacitor C6 is omitted. In FIG. 8, the embodiment implements three chokes L15 to L17 and two capacitors C16 and C17. This embodiment differs from the embodiment shown in FIG. 7 in that capacitor C14 is omitted.

Figure 13:
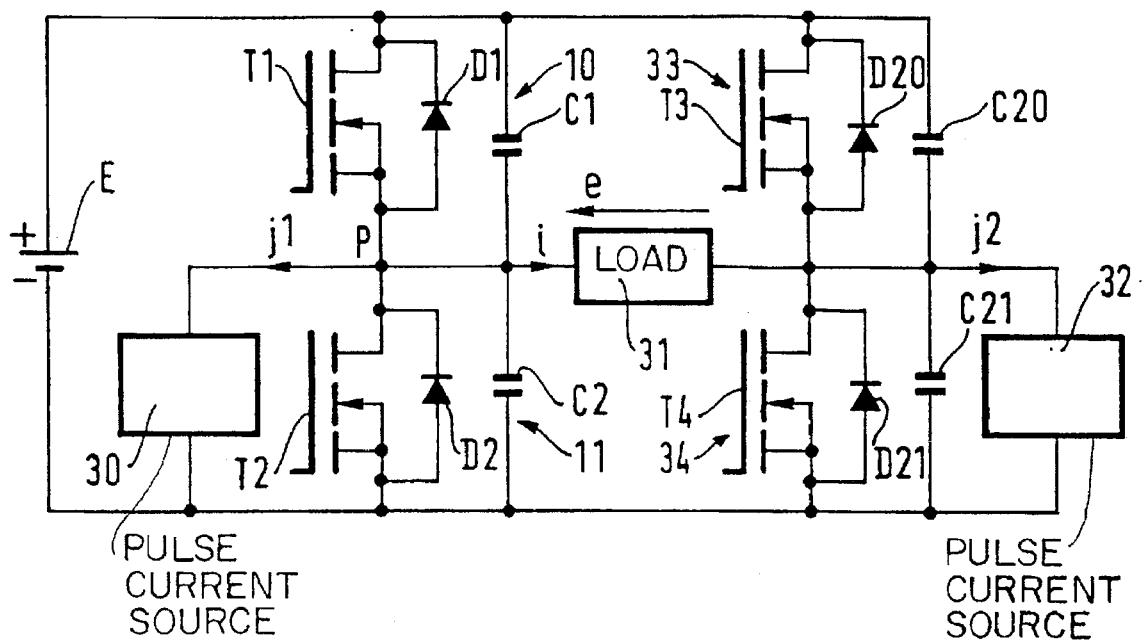
FIG. 13 shows a chopper power supply of the bridge type, implementing the present invention.

FIG. 13 shows a chopper power supply of the bridge type. The load 31 has one of its terminals connected to the common point P of the bridge described above with reference to FIG. 3, its other terminal being connected to the common point of another bridge arm constituted by two switching sections 33, 34. Switching section 33 comprises the following connected together in parallel: switching means T3, a protective diode D20, and a capacitor C20. Switching section 34 comprises the following also connected together in parallel: switching means T4, a protective diode D21, and a capacitor C21. Switching section 34 is connected in parallel to a pulse current source 32, e.g. that may be implemented as shown in FIG. 5. Source 32 passes a current j2, whereas the current flowing through source 30 is referenced j1. The load 31 may be constituted by the primary winding of a transformer.

The main advantage of the invention is that the inductor L1 used in existing circuits (FIG. 1) is omitted, and it is replaced by an LC circuit that phase-shifts the current relative to the voltage applied to the load. The LC circuit is not difficult to implement, and is more compact than the inductor L1. Overall losses are lower.

Moreover, when the load is constituted by a transformer (bridge circuit), the voltage at the secondary winding of the transformer may be adjusted by modifying the phase-shift of the control signals applied to the two bridge arms. Such operation is not possible in the state of the art.

The amplitudes and the durations of the current pulses generated may be optimized so as to be sufficient to charge and discharge the capacitors in parallel in the switching means. In this way, high currents are avoided in the switching means and the overall size is reduced.

Another advantage of the invention when it operates as a DC/DC converter (the load is constituted by a transformer) is that the voltage at the secondary winding of the transformer is lower than in the state of the art. Rectifying diodes may then be used whose maximum rated voltages are lower than those of the state of the art, and which are therefore faster.

The chopper frequency can be higher than in the state of the art, and it can be in the vicinity of 3 MHz when the current pulses are of short duration, e.g. about 30 ns. The capacitances of the capacitors in parallel can be reduced if the chopper frequency is low, and the capacitors can even be omitted if the stray capacitance Cds between the drain and the source of a MOSFET transistor is high enough to enable soft switching to be performed.

The invention enables soft switching to be performed while generating signals that are close to those obtained with hard switching.

We claim:

1. A chopper power supply including at least one bridge arm constituted by two switching sections in series receiving a DC voltage to be chopped, each switching section including switching means in parallel with a capacitor and a protective diode, said switching means being alternately closed and opened so as to supply an AC voltage at a chopper frequency, which voltage is applied to a load having one of its terminals connected to a common point that is common to said switching sections;

wherein a pulse current source is connected to said common point, said pulse current source being constituted by an LC-type circuit dimensioned so that the current flowing through said circuit is delayed by $\pi/2$ relative to the voltage applied to said load so as to deliver current pulses for alternately charging and discharging each of said capacitors on the edges of said AC voltage.

2. A chopper power supply according to claim 1, wherein said pulse current source is in parallel with at least one of said switching sections.

3. A chopper power supply according to claim 1, wherein one of the terminals of said pulse current source is connected to said midpoint, and wherein its other terminal is connected between two capacitors in series to which said DC voltage is applied.

4. A chopper power supply according to claim 1, wherein said pulse current source is constituted by a set of LC sections in parallel, each LC section being constituted by an inductor in series with a capacitor dimensioned so that the current flowing through each LC section is delayed by $\pi/2$ relative to the voltage applied to the section, so as to perform a $\pi/2$ phase shift on one of the odd harmonics of the signal applied to said load or on the fundamental of said signal.

5. A chopper power supply according to claim 1, wherein said pulse current source is constituted by three LC sections in parallel.

6. A chopper power supply according to claim 1, wherein said switching means are constituted by MOSFET transistors including said protective diodes.

* * * * *